(12) United States Patent
Maksoud et al.

(10) Patent No.: US 11,740,030 B2
(45) Date of Patent: Aug. 29, 2023

(54) HEAT STORAGE MATERIAL FOR THE HIGH-TEMPERATURE RANGE AND METHOD FOR THE PRODUCTION THEREOF

(71) Applicant: DEUTSCHES ZENTRUM FÜR LUFT-UND RAUMFAHRT E.V., Cologne (DE)

(72) Inventors: Louis Maksoud, Cologne (DE); Thomas Bauer, Cologne (DE)

(73) Assignee: DEUTSCHES ZENTRUM FÜR LUFT-UND RAUMFAHRT E.V., Cologne (DE)

( * ) Notice: Subject to any disclaimer, the term of this patent is extended or adjusted under 35 U.S.C. 154(b) by 43 days.

(21) Appl. No.: 15/779,959

(22) PCT Filed: Nov. 17, 2016

(86) PCT No.: PCT/EP2016/077967
§ 371 (c)(1),
(2) Date: May 30, 2018

(87) PCT Pub. No.: WO2017/093030
PCT Pub. Date: Jun. 8, 2017

(65) Prior Publication Data
US 2018/0347912 A1    Dec. 6, 2018

(30) Foreign Application Priority Data
Dec. 4, 2015  (DE) .......................... 102015224297.8

(51) Int. Cl.
*F28D 20/00*   (2006.01)
*C01G 1/06*    (2006.01)
(Continued)

(52) U.S. Cl.
CPC .............. *F28D 20/003* (2013.01); *C01B 9/00* (2013.01); *C01F 5/34* (2013.01); *C01G 1/06* (2013.01);
(Continued)

(58) Field of Classification Search
CPC ................ C01B 9/00; C01F 5/34; C01G 1/06
See application file for complete search history.

(56) References Cited

U.S. PATENT DOCUMENTS

| 4,311,487 A | * | 1/1982 | Luckey .............. C09K 11/7701 |
| | | | 23/305 RE |
| 4,563,339 A | * | 1/1986 | Subramanian ............ C25C 3/04 |
| | | | 423/168 |
| 5,514,359 A | * | 5/1996 | Sivilotti .................... C01F 5/30 |
| | | | 423/498 |

FOREIGN PATENT DOCUMENTS

| DE | 696 11 060 T2 | 6/2001 |
| WO | 95/31401 A1 | 11/1995 |

OTHER PUBLICATIONS

Eom etal, "Dehydration characteristics of Magnesium Chloride Hydrate", J. of Koren Inst. of Resources Recycling, vol. 16, No. 5, 2007, pp. 8-12. (Year: 2007).*

(Continued)

*Primary Examiner* — Anita Nassiri-Motlagh
(74) *Attorney, Agent, or Firm* — Seth L. Hudson; Maynard Nexsen PC

(57) ABSTRACT

The present invention relates to a material and process for producing water- and oxygen-free halogen salts of an alkali metal or alkaline earth metal, or of a transition metal, or of a metal of groups 13 or 14 of the Periodic Table, in which at least one halogen salt is heated with a heating rate of from 0.2 K/min to 30 K/min, especially from 1.0 K/min to 10 K/min, proceeding from room temperature.

8 Claims, 3 Drawing Sheets

(51) Int. Cl.
*C09K 5/12* (2006.01)
*C01B 9/00* (2006.01)
*C01F 5/34* (2006.01)

(52) U.S. Cl.
CPC ........ *C09K 5/12* (2013.01); *F28D 2020/0047* (2013.01)

(56) References Cited

OTHER PUBLICATIONS

Chemical Book, "Magnesium chloride", 2013, 4 pages, taken from https://web.archive.org/web/20130620071125/https://www.chemicalbook.com/ProductChemicalPropertiesCB9854336_EN.htm (Year: 2013).*

Chemical Book, "Magnesium chloride hexahydrate", 2013, 3 pages, taken from https://web.archive.org/web/20130620065610/https://www.chemicalbook.com/ProductChemicalPropertiesCB8681652_EN.htm (Year: 2013).*

Chemicalbook, "Lithium fluoride", taken from https://web.archive.org/web/20210815211020/htttps://www.chemicalbook.com/ChemicalProductProperty_EN_CB5854343.htm (Year: 2021).*

Adams et al., "The metling curve of sodium chloride dihydrate. An experimental study of an incongruent melting at pressure up to twelve thousand atmospheres", J. Am. Chem. Soc. 1930, 52, 11, pp. 4252-4264 (Year: 1930).*

P.J. Masset, Thermogravimetric Study of the Dehydration Reaction of LiCI H20, Journal of Thermal Analysis and Culorimetry, vol. 96 (2009) 2, 439-441.

Dr. Heiner Marx, Warmespeicher auf Salzbasis, Workshop Thermische Energiespeicher, Apr. 14, 2010, LEG Thüringen, pp. 1-26.

H. Kerskes et al., Thermochemische Energiespeicher, Chemie Ingenieur Technik 2011, 83, No. 11 pp. 2014-2026, www.cit-journal.com.

Radim Pilar et al., "Study of Magnesium Chloride Hexahydrate as Heat Storage Material", Thermochimica ACTA., vol. 546, Oct. 1, 2012, pp. 81-86, XP055337499, Amsterdam, NL.

Kashani-Nejad S et al., "MgOHCL Thermal Decomposition Kinetics", Metallurgical & Materials Transactions A: Physical Metallurgy & Materials Science, ASM International, Materials Park, OH, US vol. 36B, No. 1, Feb. 1, 2005, pp. 153-157, XP001234852.

International Search Report for International Application No. PCT/EP2016/077967 dated Feb. 1, 2017.

* cited by examiner

HEAT STORAGE MATERIAL FOR THE HIGH-TEMPERATURE RANGE AND METHOD FOR THE PRODUCTION THEREOF

FIELD OF THE INVENTION

The present invention relates to a process for preparing a heat storage material, the heat storage material to be obtained, and the use thereof.

BACKGROUND OF THE INVENTION

Heat storage systems represent a cross-sectional technology, which can also be employed in other fields, such as cogeneration, increasing the flexibility of fossil power plants, and heat recovery, in addition to solar-thermal plants. In particular, they enable a time-variable energy supply to be reconciled with a time-variable energy demand. Heat storage systems are basically classified into three different classes. These are sensible heat storage systems, latent heat storage systems with phase transition materials, and thermochemical heat storage systems. Liquids, such as water or solids, can be employed for sensible heat storage. In this case, the storage material itself is heated, and the thus heated material is stored. The amount of stored thermal energy is, to a good approximation, proportional to the temperature difference of the material employed.

In contrast, thermochemical heat storage is based on reversible thermochemical reactions. The energy is stored in the form of chemical compounds formed in an endothermal reaction. In the corresponding exothermal reverse reaction, the stored energy can be released again.

Energy storage with latent heat storage materials is associated with a phase transition (change of the state of matter) of the storage material. Corresponding materials are frequently referred to as PCM (phase change materials). The phase transition is usually from solid to liquid. The phase change is associated with the storage or release of heat and always takes place at a constant temperature.

For a few years, liquid salt storage systems are employed commercially in solar-thermal plants. These enable thermal energy to be stored for power plants at a large scale and economically. As the storage medium, a mixture of two nitrate salts, so-called solar salt, which consists of 60% by weight $NaNO_3$ and 40% by weight $KNO_3$, is mostly employed. It is cost-effective and temperature-stable for the usual fields of application. However, other nitrate salt mixtures are also known, with which it is tried to vary the temperature range in which the salt mixtures can be employed as liquid salts. The salt mixtures employed have a defined working range in terms of the minimum temperatures (due to the melting temperature) and the maximum temperature (due to thermal decomposition). The maximum temperature of usual solar salts is limited to about 560° C. because of the thermal decomposition of the nitrate salts employed. Other possible field of application for liquid salts are in the field of heat carriers and thermal control of reactors in process industry.

Drawbacks of the usually employed solar salts include the limited minimum temperature, and in particular, the maximum temperature of about 560° C., above which nitrate salts will decompose. Alternative nitrate salts or mixtures of nitrate salts with a higher thermal stability are not known.

Solar salts usually have to be produced synthetically, because naturally obtained nitrate salts have many impurities, which result in high corrosion rates. However, the purification of the salts is very complicated in terms of process technology. However, the synthetic production of nitrate salts through the Haber-Bosch process also involves a high energy consumption.

In mixtures of nitrate salts, reduction of the melting temperature and thus of the lower temperature limit is possible by adding further salts. Although the temperature can be reduced by adding calcium nitrate to the potassium nitrate and sodium nitrate, this is to the detriment of thermal stability. The addition of lithium nitrate would increase the cost. In contrast, the addition of sodium nitrite results in a higher risk potential for humans and the environment.

The application for storage systems requires large amounts of nitrate salt. Thus, for example, the Andasol power plant in Spain with 50 MWel and a storing time of 7 hours requires about 28,000 tons of solar salt. The annual amount on the world market or the production capacities of sodium nitrate are relatively low for such a storage application. Nitrates are mainly employed as fertilizers, so that there may be price effects between the fertilizer and energy storage markets. All in all, however, there are drawbacks related to the availability of nitrate salts.

Therefore, on the one hand, there is a need for alternatives to solar salt that can be employed also at temperatures of above 560° C., in particular, at 700° C. or higher, up to 1000° C., i.e., in the high temperature range.

On the other hand, it is also desirable that a dependence on products that are also predominantly used for other products no longer exists.

Surprisingly, it has been found that halogen salts can be employed as an alternative to nitrate salts as heat storage materials for the high temperature range. From the literature, it is known that halogen salts are highly corrosive towards metallic materials. However, it is just metallic materials of stainless steel that are employed in solar-thermal or other thermal plants, because the heat and power generation is to be cost-effective, and components of stainless steel can be produced at a low cost. Now, it has been found that the reason for the corrosiveness is contaminants in the melt. Thus, for example, magnesium oxide and HCl are formed from magnesium chloride in the presence of water according to the following equation I:

$$MgCl_2 + H_2O \rightarrow MgO + 2HCl \qquad (I)$$

Contaminants in the halogen salt melt, for example, from oxides or hydroxides, are formed by air contact, moisture, and decomposition of hydrate salts.

BRIEF SUMMARY OF THE INVENTION

Therefore, it is the object of the present invention to achieve acceptable metallic corrosion rates of halogen salts to be able to use them as liquid salt, and thus to provide an alternative to solar salt that is thermally stable even at temperatures of 500° C. or more, and especially 700° C. or more. In particular, the cost factor is also critical, since electric power is to be provided as inexpensively as possible.

In a first embodiment of the present invention, the object of the present invention is achieved by a process for producing essentially water- and oxygen-free halogen salts of an alkali metal or alkaline earth metal, or of a transition metal, or of a metal of groups 13 or 14 of the Periodic Table, in which at least one halogen salt is heated with a heating rate of from 1.0 K/min to 30 K/min, especially from 1.0 K/min to 25 K/min or 20 K/min, preferably from 3.5 K/min or from 3.7 K/min to 15 K/min or to 10 K/min, proceeding from room temperature (20° C.). Surprisingly, it has been found that the purity of the halogen salts is a factor in the question of corrosiveness.

BRIEF DESCRIPTION OF THE DRAWINGS

The present invention is illustrated and described herein with reference to the drawing, in which like reference numbers denote like method steps and/or system components, respectively, and in which.

DETAILED DESCRIPTION OF THE INVENTION

Figure 1:
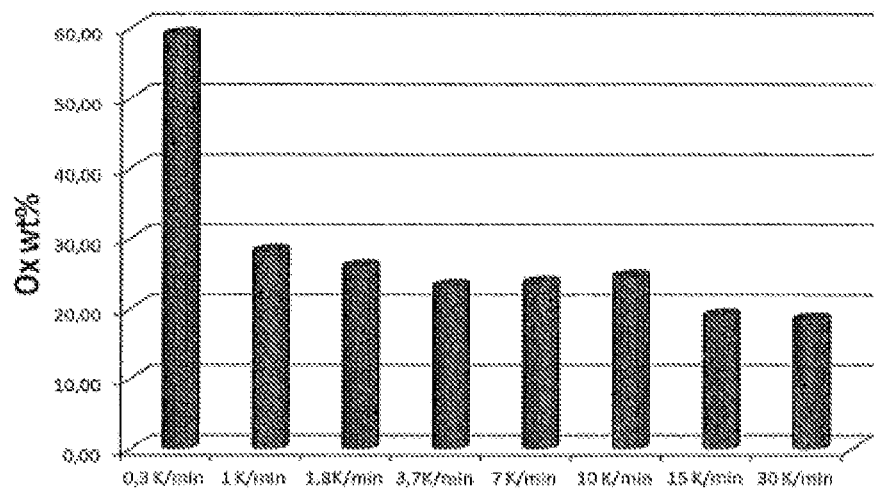
FIG. 1 is a bar graph illustrating measurements at different heating rates.

It has now been found that a particularly low oxide content in the melt can be achieved at the mentioned heating rates. As can be seen from equation I, the oxide content of the melt is an essential parameter for evaluating the salt purity. Surprisingly, it has now been found that the oxide content of the melt can be reduced significantly already at low heating rates of, for example, 0.2 K/min or 0.3 K/min or 0.5 K/min, i.e., less than 1.0 K/min. Heating on a small scale provided oxide contents of approximately 60%. In larger systems, heating rates can be very variable since heat input by thermal conduction into the bulk represents an essential limitation. Surprisingly, it has now been found that heating rates of 1 K/min or more result in significantly lower oxide contents of less than 30%. Especially heating rates within a range of from 3.5 to 10 K/min are particularly suitable because the time required for the heating of the halogen salt is within an acceptable range on the one hand; on the other, the oxide content can be kept low. Therefore, the heating rate is preferably 0.2 K/min or more, especially 0.5 K/min or more, preferably 1.0 K/min or more, or 3.5 K/min or more. However, a heating rate of more than 30 K/min does not yield any better, and in part worse, results so that the heating rate is preferably 30 K/min or less, especially 25 K/min or less, or 20 K/min or less, especially 15 K/min or less, and preferably 10 K/min or less.

FIG. 1 illustrates measurements at different heating rates. As the halogen salt, $MgCl_2$ as the hexahydrate as commercially available, for example, from the company Alfa Aesar, is employed. The water molecules are present both as water of crystallization and, because of the hygroscopic property of $MgCl_2$, as bound water. Just for the removal of water of crystallization, it is usually considered that heating as slowly as possible and thus low heating rates is particularly effective. Surprisingly, it has now been found that very low heating rates have the opposite effect.

In FIG. 1, the heating rate in kelvins per minute (K/min) is plotted on the x axis. The y axis represents the amount of MgO in % by weight, based on 100% by weight for the total weight of the sample after heating. After the heating, the sample consists of dry $MgCl_2$ and MgO, which is formed because of the hydrolysis. Thus, for example, a heating rate of 0.3 K/min yield a formation of 58% by weight MgO, which means that 58% by weight MgO is contained, based on the total weight of the sample.

The heating is effected from room temperature up to the maximum temperature of the corresponding halogen salt. The maximum temperature is the melting temperature of the salt, which individually depends on the type of halogen salt. In later use, the liquid salts are employed above the melting temperature up to the maximum operating temperature. For a mixture of $MgCl_2$—KCl—NaCl, a preferred working range is at 400° C. to 700° C., for example.

The salt purification process according to the invention enables the production of a solid or liquid, essentially water- and oxygen-free halogen salt mixture with a content of 90% by weight or more of pure halogen salt. These pure halogen salts react little corrosively towards metallic materials.

Halogen salts within the meaning of the present invention include individual halogen salts. However, mixtures of different halogen salts are also included. Because of the mixtures, the temperature range in which the halogen salts can be employed can be extended in terms of the minimum operating temperature. This is achieved by lower melting temperatures of the salt mixtures as compared to the individual salts. Other properties, such as heat capacity, thermal and chemical stability, may also be adjusted in this way. Thus, for example, a halogen salt of an alkali metal can be combined with that of an alkaline earth metal at any mixing ratio. Different halogen salts, for example, of an alkali metal or of an alkaline earth metal or of one of the mentioned metals or transition metals, are also included presently. Mixtures as used herein may include two, three, four or more different halogen salts with different cations (for example, Li, Na, K, Ca, Mg, Sr, Ba, Zr, Ti, Cr, Mn, Fe, Cu, Zn, Al, Pb) and anions (for example, F, Cl, Br).

According to the invention, the heating may be effected continuously or discontinuously. "Continuously" means that the heating rate remains constant throughout the duration of heating, i.e., the heating rate is set at the beginning of the heating and remains unchanged subsequently, i.e., there is a fixed heating rate.

However, it is also possible that the heating rate is varied during the heating. Correspondingly variable heating rates allow the heating rate to be adapted to the corresponding halogen salt. For example, if no water should be contained in the sample any more clearly before the melting temperature is reached and thus before the end point of the heating, then the heating rate may be increased so that the process of heating takes a shorter time. The cleavage of water (of crystallization) from the halogen salt can be monitored by means of thermal analysis (determination of the mass loss).

Variable heating rates also enable a heating program with temperature ramps and isothermal segments. This means that the temperature is kept constant at those temperatures at which the cleavage of water from the halogen salt proceeds particularly effectively, as long as there is still cleavage of water. Only thereafter, the temperature is increased further. In this case too, the heating rate can be adjusted and adopted in accordance with the mass loss observed until then. The temperatures at which the temperature is kept constant, i.e., the isothermal segments, differ from halogen salt to halogen salt and can be determined by those skilled in the art by means of a thermal analysis.

Surprisingly, it has been found that the oxide content in the melt can also be reduced by adding an additive. The additive is a reducing agent. It is added to the halogen salt in an amount of from 1% by weight to 40% by weight, especially from 5% by weight to 30% by weight, or from 7% by weight to 25% by weight, especially from 10% by weight to 20% by weight, or up to 15% by weight. These values mean that, starting from 100% by weight of the halogen salt, for example, 10% by weight of the additive is additionally added, so that an amount of 110% by weight is present after the addition of the additive.

Figure 2:
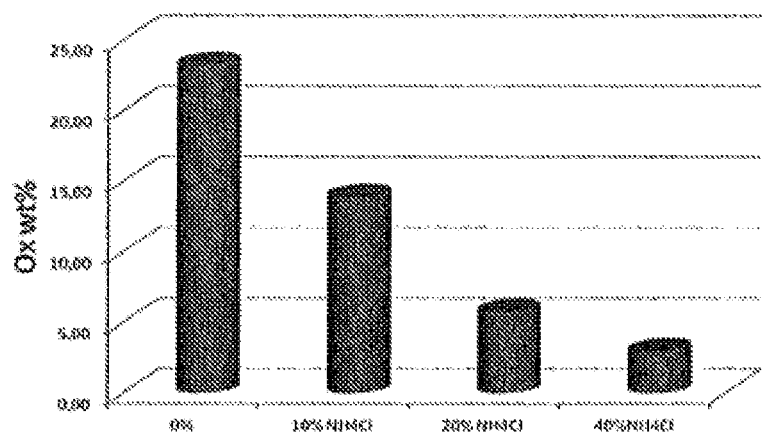
FIG. 2 is a bar graph illustrating the amount of magnesium oxide after combination with an additive.

FIG. 2 shows the amount of magnesium oxide after combination with an additive, presently $NH_4Cl$. They axis represents the amount of MgO in % by weight, based on 100% by weight for the total weight of the sample after heating. As in the measurements relating to FIG. 1, $MgCl_2*6H_2O$ was employed as the halogen salt. Thus, the addition of 20% by weight of $NH_4Cl$ results in the reduction of the oxide content, so that the sample contained only 5% by weight MgO. Here, the proportion of additive is stated as based on 100% by weight $MgCl_2$. A sample with 20% by weight additive is to be understood in such terms that, for example, 20 g of additive is added to a sample of 100 g of halogen salt.

Surprisingly, it has been found that a reduced oxide content is enabled simply by the addition of the additive. More preferably, the heating at the preferred heating rates is effected in the presence of at least one additive, especially $NH_4Cl$. This method can achieve particularly good results in which the oxide content is particularly low.

Figure 3:
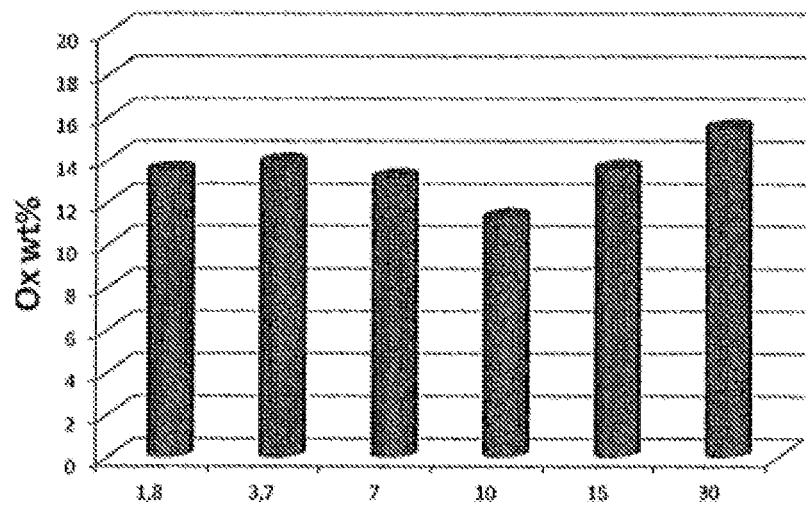
FIG. 3 is a bar graph illustrating the measurements of the presence of 10% by weight $NH_4Cl$.

FIG. 3 shows a measurement in the presence of 10% by weight $NH_4Cl$. $MgCl_2*6H_2O$ was employed as the halogen salt and heated at different heating rates. The heating rates are represented on the x axis. The y axis represents the amount of MgO in % by weight, based on 100% by weight for the total weight of the sample after heating. It is found that heating rates within a range of from 3.7 K/min to 15 K/min or up to 10 K/min, in particular, yield particularly good results, i.e., particularly low oxide amounts in the magnesium chloride melt.

The additive is preferably selected from ammonium chloride, silicon, magnesium and/or zirconium. Ammonium chloride is particularly preferred. The additive is able to reduce the oxide content of the melt. There is a correlation between the amount of additive added and the oxide content in the melt. Therefore, an amount of at least 5% by weight of additive is preferably added, because lower amounts do not lead to such a reduction of the oxide content that the corrosion would be reduced to any significant extent.

At the same time, however, the content of additive is to be kept as low as possible, because these are contaminants in the salt melt. For example, zirconium, magnesium or silicon react with the respective salt melts to form the respective oxide. Zirconium oxide or also silicon dioxide would then be visible as a precipitate in the salt melt, because they do not melt at the respective working temperature of the halogen salt. Although the corrosiveness is reduced here, other problems might arise. Therefore, ammonium chloride is preferred as the additive. Here, ammonia ($NH_3$) is obtained as a by-product, which is a gas at the predominant temperatures that can escape from the melt, so that there is no contamination of the salt melt.

Figure 6:
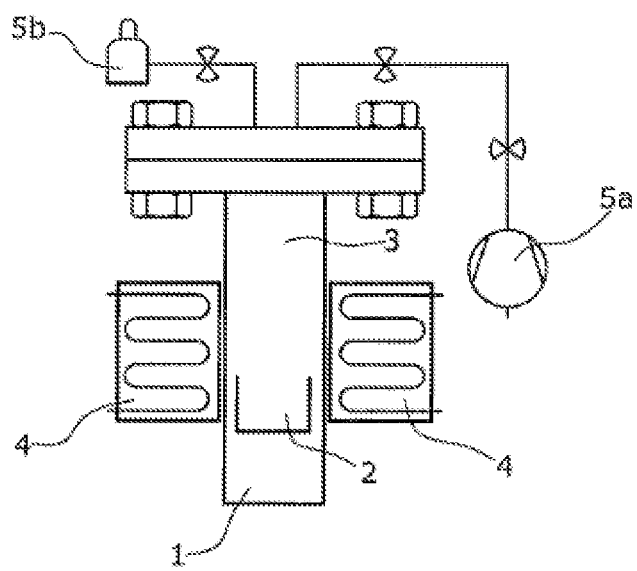
FIG. 6 is a schematic view of the device of the present invention.

It has further been found that the oxide content of the melt is influenced by the atmosphere in which the melt is produced. Therefore, the heating is preferably effected under vacuum and/or in a protective atmosphere. The heating preferably takes place in a device that has at least one closed container (1) made of a halogen-inert material, at least one device (5a, 5b) for setting the atmosphere inside the container, and at least one external device (4) for setting the temperature inside the container. FIG. 6 schematically shows a device according to the invention in one embodiment. The device for setting the atmosphere inside the container is outside the container. Thus, it is an external device (5a, 5b). This device for setting the atmosphere preferably comprises a vacuum pump (5a) and/or a gas supply line (5b) for an inert gas. Also, the device (4) for setting the temperature inside the container is outside the container (1) and is thus an external device.

Now, the halogen salt (2) is inside the closed container (1) of the device according to the invention. The container (1) is not completely filled with the halogen salt (2). Rather, the interior of the container is divided into two zones. In one zone, there is the halogen salt or, after heating, the halogen salt melt. Above, there is an atmosphere (3). At the beginning of the process, this zone is usually filled with air. It has now been found that the oxide content in the melt can be reduced particularly well if the atmosphere (3), i.e., the gas phase above the halogen salt (2), is free of oxygen if possible. This can be achieved by generating a vacuum. The pressure reached by the vacuum inside the container is preferably within a range of from $10^{-3}$ mbar to $10^{-2}$ mbar. It is also possible to exchange the air against an inert gas, such as nitrogen, argon or helium. This can also prevent oxidation of the halogen salt and thereby reduce the oxide content in the melt. Thus, by means of an inert gas, the oxide content can be reduced by at least 30% as compared to heating in air; under vacuum, values are reached that are about 50% below those under the influence of air.

According to the invention, it is also possible to combine the vacuum and inert gas. Thus, for example, the heating can take place under vacuum. As soon as the maximum temperature (melting temperature of the halogen salt) is reached, the vacuum is switched off, and the container is filled with an inert gas, especially with argon. It is also possible that the heating also takes place under an inert gas. In all cases, the inert gas can be introduced to the interior of the container either only in the atmosphere (3) above the salt melt, or it is also possible that the inert gas is introduced into the salt melt. Thereby, the gas, which then exits towards the atmosphere, can drag off water from the halogen salt, which further improves the cleaning performance.

More preferably, the heating of the salt melt is performed under vacuum. When the halogen salt is exposed to air after the drying process, the formation of oxides therein will again take place. This is due to the moisture contained in the air and the hygroscopic properties of the halogen salts. Surprisingly, it has now been found that the formation of oxides in salt melts that were dried under vacuum can be prevented over a period of time longer than that for salt melts that were dried under air.

$MgCl_2*6H_2O$ that was dried under vacuum was exposed to ambient air after the drying, as would be done in later use. The oxide content was determined 24 hours after the drying process. During this time, the halogen salt was in air. Similar measurements were performed with $MgCl_2*6H_2O$ that was dried under an air atmosphere. While the salt dried under vacuum absorbed only 3% by weight water within 24 hours, this value was 37% by weight for the salt dried in air.

Therefore, it is particularly preferred that the heating takes place under vacuum.

Figure 4:
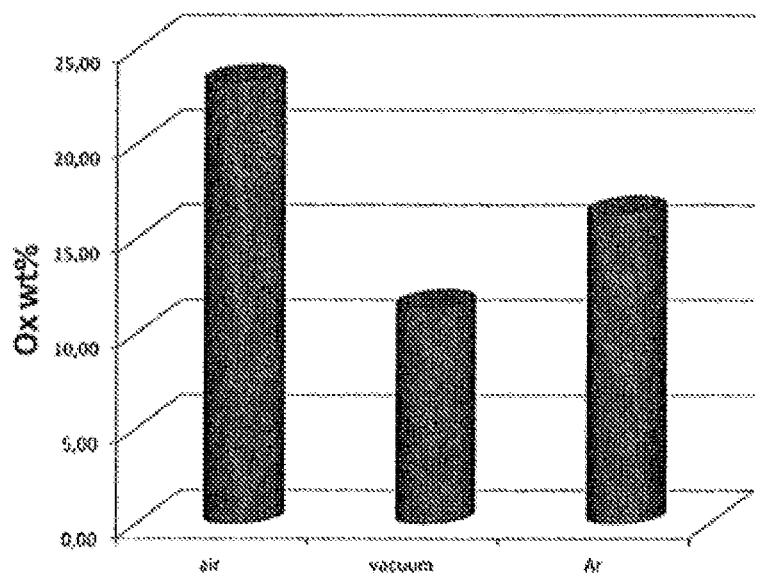
FIG. 4 is a bar graph illustrating the results of measurements in various atmospheres.

FIG. 4 shows results of the measurements in different atmospheres. Again, $MgCl_2*6H_2O$ was employed as the halogen salt. The y axis represents the amount of MgO in % by weight, based on 100% by weight for the total weight of the sample after heating. The different atmospheres (air, vacuum and inert gas (argon, Ar)) are explained on the x axis. Surprisingly, it has been found that the content of oxides can be significantly reduced by vacuum or an inert gas.

Figure 5:
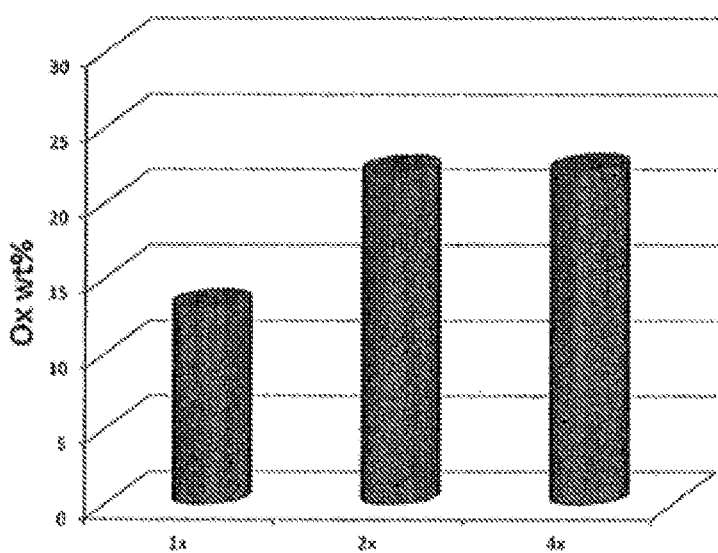
FIG. 5 is a bar graph illustrating the results of various measurements.

Further surprisingly, it has been found that a repetition of the heating in a second, third or further cycle is not required, but is rather disadvantageous. Therefore, the heating is preferably performed only once. Upon repeated heating, the oxide content in the salt melt will again increase, so that an opposite effect can be observed here against all expectations. FIG. 5 shows the results of corresponding measurements. The amount of MgO in % by weight, based on 100% by weight for the total weight of the sample after heating, is represented on the y axis, and the number of repetitions is mentioned on the x axis. After more than 2 repetitions, no further increase of the oxide content is found. However, after the first repetition (2×), the oxide content is about twice as high as after only one heating cycle (1×).

The oxide content in the melt was respectively determined by acid/base titration and vacuum filtration. In the titration, the salt was dissolved in 1 M HCl solution, and a titration was effected with 1 M NaOH solution in the presence of phenolphthalein as an indicator. In the vacuum filtration, the salt was dissolved in water and subsequently filtered. Oxides formed (magnesium oxide, sodium oxide) are not soluble in water and could subsequently be weighed after drying. The values shown in FIGS. 1 to 5 are mean values from several measurements with one or both methods.

The container of the device according to the invention is made from a halogen-inert material. These include, for example, non-metals, especially oxygen-free compounds, preferably nitrides, carbides, borides, sulfides and silicides, especially boron nitride, silicon nitride, graphite, glassy carbon, or silicon carbide, preferably boron nitride and glassy carbon. It is also possible to produce a container that has two or more of the mentioned materials. Preferably, the container substantially consists of one of the mentioned materials. Also, specific steel alloys, especially 1.44 xx, 1.45 xx, 1.48 xx and 2. xxx alloys are suitable for producing a corresponding container.

A device according to the invention may have one, two or more containers. Preferably, the device comprises two containers, wherein a first container is at first filled with the halogen salt, and the salt melt is prepared here. The second container, which is separate therefrom, preferably has a larger volume than that of the first container and serves as a storage container for the salt melt.

The device according to the invention further comprises at least one device for setting the atmosphere inside the container. This may be, for example, a vacuum pump or a gas port, through which the gas phase above the salt melt is kept free of oxygen, either by generating a vacuum or by introducing an inert gas.

Further, the device includes at least one device for setting the temperature inside the container. This container is the first container according to the above definition, rather than the storage container. The device for setting the temperature is an external heat source that is in direct contact with the halogen salt and enables a stepwise purposeful temperature increase of the halogen salt.

In another embodiment, the object of the present invention relates to a heat storage material for the high temperature range comprising at least one essentially water- and oxygen-free halogen salt of an alkali metal or alkaline earth metal, or of a transition metal, or of a metal of groups 13 or 14 of the Periodic Table, especially of an alkali metal or alkaline earth metal.

Preferably, the content of the halogen salt in the heat storage material is 90% by weight or more, based on 100% by weight for the heat storage material, especially 92% by weight or more, especially 95% by weight or more, or 97% by weight or more, preferably 98% by weight or more, or 99% by weight or more. This means that the purity of the halogen salt is high, and the oxide content in the melt is kept low thereby, whereby the corrosiveness towards metals is low. Preferably, the halogen salt is a bromine, fluorine or chlorine salt.

The alkali metal is preferably selected from lithium, sodium and/or potassium. The alkaline earth metal is preferably selected from magnesium, calcium, strontium, and/or barium. The transition metal and the metal are preferably selected from zirconium, titanium, chromium, manganese, iron, copper, zinc, aluminum and/or lead. The selection of the respective metals is effected, in particular, under the aspect of cost. The metals are to be available at low cost in sufficient amounts and form a salt with the mentioned halogens, especially with chlorine. The individual alkali, alkaline earth, transition and metal salts can be combined with each other, especially in order to reduce the melting temperature, and also to be able to set properties of the halogen salt melt otherwise.

In another embodiment, the present invention relates to the use of essentially water- and oxygen-free halogen salts of an alkali metal or alkaline earth metal, or of a transition metal, or of a metal of groups 13 or 14 of the Periodic Table, as a heat storage material for the high temperature range, i.e., temperatures of 560° C. or more, especially of 700° C. or more.

EXAMPLE $MgCl_2*6H_2O$ was acquired from the company Alfa Aesar. To 100% by weight of this salt, 10% by weight of $NH_4Cl$ was added as an additive.

The salt and additive were heated at a heating rate of 7 K/min starting at room temperature (20° C.) up to a temperature of 350° C. This was done under vacuum, wherein a pressure within a range of from $10^{-3}$ to $10^{-2}$ mbar was set.

The oxide content was subsequently determined to be 8.56% by weight.

The same salt was dried without an additive in air at a heating rate of 0.3 K/min. The oxide content was 59.01% by weight.

The results are listed for comparison in the following Table.

| | $MgCl_2*6H_2O$ | |
| --- | --- | --- |
| Conditions | No additive<br>Heating rate: 0.3 K/min<br>Heating in air | 10% by weight $NH_4Cl$ as additive<br>Heating rate: 7 K/min<br>Heating under vacuum |
| Hydrolysis<br>(MgO %<br>by weight) | 59.01 | 8.56 |

The invention claimed is:

1. A process for producing halogen salts of an alkali metal or alkaline earth metal with a content of 90% by weight or more of pure halogen salt, comprising, heating a hydrated halogen salt of alkali metals or alkaline earth metals from room temperature to the melting temperature of an anhydrous halogen salt corresponding to the hydrated halogen salt with a heating rate of from 0.1 K/min to 10 K/min in the presence of at least one additive as a reducing agent, wherein the additive is ammonium chloride (NH$_4$Cl) or magnesium, and wherein the heating is effected under vacuum or in a protective atmosphere of inert gas, wherein the halogen salt is selected from bromine, fluorine, chlorine and their mixtures, the alkali metal is selected from lithium, sodium, potassium and their mixtures and the alkaline earth metal is selected from magnesium, calcium, strontium, barium and their mixtures.

2. The process according to claim 1, wherein the heating is continuously or discontinuously.

3. The process according to claim 1, wherein the additive is added to the halogen salt during the heating in an amount within a range of from 1% by weight to 40% by weight.

4. The process according to claim 1, the heating is effected only once.

5. The process according to claim 1, wherein the heating rate is from 1.0 K/min to 10 K/min.

6. The process according to claim 1, wherein the heating rate is from 3.5 K/min to 10 K/min.

7. The process according to claim 1, wherein the alkaline earth metal is magnesium and the halogen salt is chlorine.

8. The process according to claim 1, wherein the salt is MgCl$_2$—KCl—NaCl.

\* \* \* \* \*